(No Model.)

N. P. SMITH.
PULLEY.

No. 409,878. Patented Aug. 27, 1889.

WITNESSES:
F. McArdle
C. Sedgwick

INVENTOR:
N. P. Smith
BY Munn & Co.
ATTORNEYS.

United States Patent Office.

NATHANIEL P. SMITH, OF MEMPHIS, TENNESSEE.

PULLEY.

SPECIFICATION forming part of Letters Patent No. 409,878, dated August 27, 1889.

Application filed December 1, 1888. Serial No. 292,379. (No model.)

*To all whom it may concern:*

Be it known that I, NATHANIEL P. SMITH, of Memphis, in the county of Shelby and State of Tennessee, have invented a new and useful Improvement in Pulleys, of which the following is a full, clear, and exact description.

This invention relates to split pulleys in which a spider having angular or irregularly-shaped bearing-surfaces on the shaft of the pulley and adjustable to suit different-sized shafts is applied to the rim-sections of the pulley.

The object of the invention is primarily to adjust the pulley to large or small shafts without having recourse to a bushing, and, secondly, to provide for adjusting the pulley so that it will run true even when the shaft or surface carrying it is eccentric, or so that the pulley may be eccentrically fitted, if desired; and the invention consists in certain novel constructions and combinations of parts which make up the pulley and provide for its adjustment, substantially as hereinafter described, and pointed out in the claims.

Reference is to be had to the accompanying drawings, forming a part of this specification, in which similar letters of reference indicate corresponding parts in all the figures.

Figure 1:
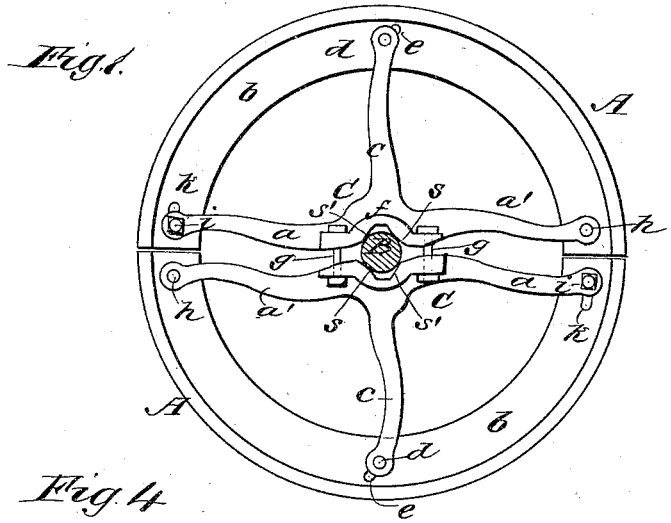
Figure 4:
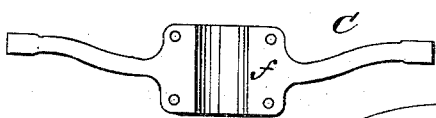
Figure 2:
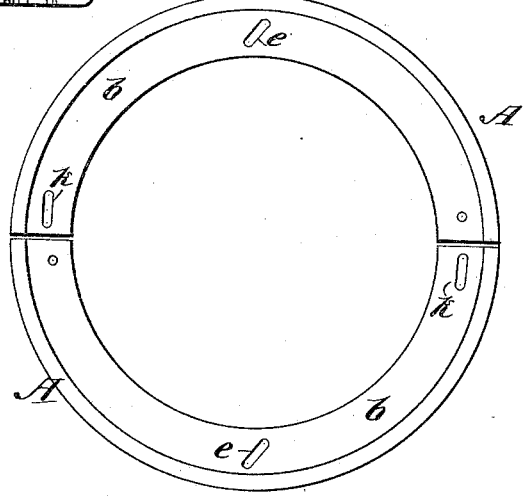
Figure 5:
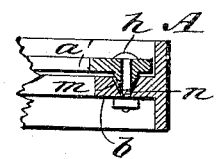
Figure 3:
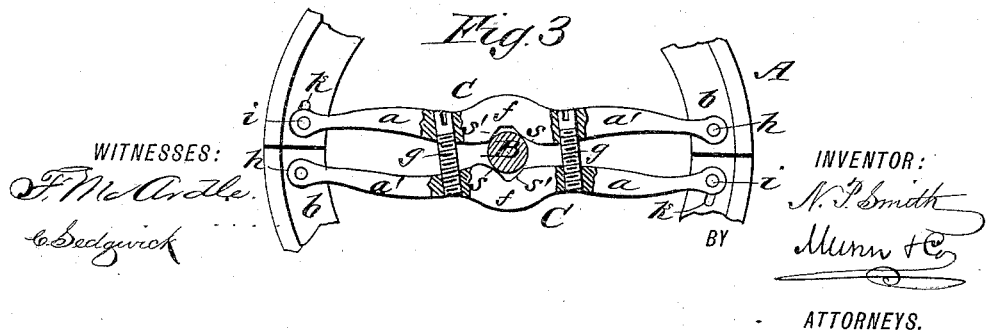

Figure 1 represents a side view of a pulley embodying my invention and as secured to its shaft. Fig. 2 is a side view of the divided rim portion of the pulley; Fig. 3, a side view, in part, of the pulley as secured to its shaft by the divided spider, and bolts securing the spider to the shaft. Fig. 4 is a view of one section of the spider shown in Fig. 1, as seen from its inner side or face; and Fig. 5, a section of the pulley in part parallel with its axis, and showing a special construction for uniting one arm of either spider section with the rim of the pulley.

A A are the two sections or halves which constitute the rim of the split pulley, and which may be made of wood or other material, as desired. Said rim is composed of a circumferential portion parallel with the longitudinal axis of the pulley and an inner central flange portion $b$ at right angles to said axis.

B indicates a shaft which is designed to carry the pulley, and C C the divided spider or spider-sections, each composed, mainly, of two arms $a$ $a'$, arranged in parallel relation with each other on opposite sides of the shaft, and connecting, respectively, the one the opposite ends of the one pulley-section and the other the opposite ends of the other pulley-section. Said spider-section may also be provided with an intermediate or third arm $c$, connected with its particular pulley-section by a bolt $d$, passing through a slot $e$ in the flange $b$ of the pulley-section to provide for adjustment of the spider-sections, as hereinafter described. Each spider-section C is constructed with a central partial hub portion $f$ to clip or bind on the shaft B when the two spider-sections are properly adjusted and united with each other by clamping-bolts $g$ $g$ on opposite sides of the shaft, as in Fig. 1 or 3. The inner bearing-surfaces of these hub portions $f$ of the spider-sections C C on the shaft B do not conform to the circular contour of the shaft, but are of angular and irregular shape to provide for fitting different-sized shafts, and said bearing-surfaces are preferably made slightly convex and slightly concave on opposite sides of the shaft for each spider-section and in reverse relation with each other for the two of said sections, as shown at $s$ $s'$ in Figs. 1 and 3, to better provide for fitting shafts of different sizes and of irregular or eccentric shape, so that the pulley may run true or eccentric, as desired. The spider-sections C C have their arms made with an offset, or, in other words, are suitably curved or shaped to provide for their connection with the flange portions of the rim of the pulley without destroying the parallelism of their central or hub portions with said rim. The arms $a'$ $a'$ of the two spider-sections on opposite sides of the axis of the pulley are pivotally connected in a positive manner, as by bolts $h$ $h$, to the flange portions $b$ of the rim parts of the pulley-sections, while the other or opposite arms $a$ $a$ are adjustably connected at their outer ends with the pulley rim-sections, as by bolts $i$ $i$, passing through slots $k$ $k$ in the flange portions $b$. This provides, by suitably slackening the bolts $i$ $i$ and the clamping-bolts $g$ $g$, for adjusting the spider-sections C C to fit different-sized shafts or irregular or eccentric shaped shafts, and so that the pulley may be set to run true, or eccentrically, if desired, the bolts $g\ g$ being separately adjusted as necessary to hold the pulley firmly on the shaft, and the bolts $i\ i$ being suitably tightened up. The arms $a'\ a'$ of the spider-sections C C are each constructed at their outer ends, through which the pivot-bolts $h$ pass, with a conical projection $m$, arranged to enter a correspondingly-conical recess $n$ in the flange portion $b$ of the rim, for the purpose of relieving the bolts $h$ of strain, as clearly illustrated for the one spider-section in Fig. 5 of the drawings.

Having thus described my invention, what I claim as new, and desire to secure by Letters Patent, is—

1. In split pulleys, the combination of the rim-sections A A, the pivoted and adjustable spider-sections C C, constructed with opposite partial hub portions $f\ f$, of angular and irregular contour on their interior, and each provided with arms $a\ a'$, connecting the opposite ends of their respective pulley rim-sections, and the uniting or clamping bolts $g\ g$, the arms $a'\ a'$ being pivotally connected with the rim-sections of the pulley on opposite sides of the axis of the latter, and the arms $a\ a$ being adjustably connected with the like rim-sections on reverse sides of said axis, substantially as specified.

2. In a split pulley, the combination of the rim-sections A A, having inner flanges $b$, provided with conical recesses $n$ and slots $k$ on reverse sides of the axis of the pulley, and with the slot $k$ of either pulley-section on the opposite side of said axis to the slot $k$ of the other pulley-section, the spider-sections C, provided with conical projections $m$, adapted to fit the conical recesses $n$, the pivotal bolts $h$, passing through the conical projections $m$, and the bolts $i$, passing through the slots $k$ in the flanges of the pulley-sections and through the spider-sections C, substantially as specified.

3. In a split pulley, the combination of the rim-sections A A, having a central inner flange $b$, provided with slots $k\ k$, the spider-sections C C, having partial hub portions $f$, of irregular contour on their interior, and opposite arms $a\ a'$, the bolts $h$, pivoting the spider-sections on opposite sides of the axis of the pulley to the rim-sections, the bolts $i\ i$, arranged to pass through the slots $k\ k$ and connecting the opposite ends of the spider-sections with the rim-sections, and the clamping-bolts $g\ g$, all for operation in relation with the shaft carrying the pulley, essentially as shown and described.

NATHANIEL P. SMITH.

Witnesses:
BENJ. G. W. MUSSENDEN,
WM. E. BARNES.